US012627582B2

(12) United States Patent
Muñoz De La Torre Alonso et al.

(10) Patent No.: US 12,627,582 B2
(45) Date of Patent: May 12, 2026

(54) METHODS, APPARATUS AND COMPUTER-READABLE MEDIUM FOR MONITORING SITE ACCESS OVER A MOBILE COMMUNICATION NETWORK

(71) Applicant: Telefonaktiebolaget LM Ericsson (publ), Stockholm (SE)

(72) Inventors: Miguel Angel Muñoz De La Torre Alonso, Madrid (ES); Rodrigo Alvarez Dominguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 3 days.

(21) Appl. No.: 18/730,466

(22) PCT Filed: Mar. 4, 2022

(86) PCT No.: PCT/EP2022/055545
§ 371 (c)(1),
(2) Date: Jul. 19, 2024

(87) PCT Pub. No.: WO2023/138795
PCT Pub. Date: Jul. 27, 2023

(65) Prior Publication Data
US 2025/0126034 A1      Apr. 17, 2025

(30) Foreign Application Priority Data

Jan. 21, 2022    (EP) ..................................... 22382038

(51) Int. Cl.
*H04L 43/062* (2022.01)
*H04L 43/20* (2022.01)
*H04L 67/52* (2022.01)

(52) U.S. Cl.
CPC ............ *H04L 43/062* (2013.01); *H04L 43/20* (2022.05); *H04L 67/52* (2022.05)

(58) Field of Classification Search
CPC ....... H04L 43/062; H04L 43/20; H04L 67/52; H04L 67/306; H04L 67/1396; H04L 67/535; H04L 63/1408; H04W 12/12
See application file for complete search history.

(56) References Cited

U.S. PATENT DOCUMENTS

| | | | |
|---|---|---|---|
| 2021/0243126 A1* | 8/2021 | Campo Trapero ...... | H04L 67/55 |
| 2023/0013118 A1* | 1/2023 | Sharma ................. | H04W 48/18 |
| 2024/0146702 A1* | 5/2024 | Puente Pestaña ... | H04L 63/0442 |

FOREIGN PATENT DOCUMENTS

WO        2021254600 A1    12/2021

OTHER PUBLICATIONS

International Search Report and Written Opinion dated Oct. 10, 2022 for International Application No. PCT/EP2022/055545 filed Mar. 4, 2022, consisting of 13 pages.

(Continued)

*Primary Examiner* — Benjamin M Thieu
(74) *Attorney, Agent, or Firm* — Weisberg I.P. Law, P.A.

(57) ABSTRACT

Methods, apparatus and computer-readable media are provided for monitoring access to one or more sites over a mobile communication network. One method is performed by a client network entity for monitoring access to one or more sites over a mobile communication network. The method includes: transmitting, to a network exposure entity of the mobile communication network, a request message for the network exposure entity to report instances of one or more wireless devices accessing one or more sites over the mobile communication network; and receiving, from the network exposure entity, a report of instances of one or more wireless devices accessing the one or more sites over the mobile communication network.

17 Claims, 11 Drawing Sheets

400

(56)         References Cited

OTHER PUBLICATIONS

3GPP TS 29.522 V17.2.0; 3rd Generation Partnership Project;
Technical Specification Group Core Network and Terminals; 5G
System; Network Exposure Function Northbound APIs; Stage 3
(Release 17); Jun. 2021, consisting of 257 pages.
Ramezanian, S. et al.; Parental Control with Edge Computing and
5G Networks; 2021 29th Conference of Open Innovations Asso-
ciation (FRUCT); May 12, 2021, consisting of 11 pages.
Gonzalez, R. et al.; User Profiling by Network Observers; Proceed-
ings of the 17th International Conference on Emerging Networking
Experiments and Technologies; Dec. 2, 2021, consisting of 11
pages.
3GPP TS 29.522 V17.4.0; 3rd Generation Partnership Project;
Technical Specification Group Core Network and Terminals; 5G
System; Network Exposure Function Northbound APIs; Stage 3
(Release 17); Dec. 2021, consisting of 349 pages.
3GPP TS 29.591 V17.4.0; 3rd Generation Partnership Project;
Technical Specification Group Core Network and Terminals; 5G
System; Network Exposure Function Southbound Services; Stage 3
(Release 17); Dec. 2021, consisting of 44 pages.

* cited by examiner

Transmitting, to a network exposure entity, a request message for the network exposure entity to report instances of wireless device(s) accessing one or more sites — 402

Receiving, from the network exposure entity, a report of instances of one or more wireless devices accessing the one or more sites — 404

400

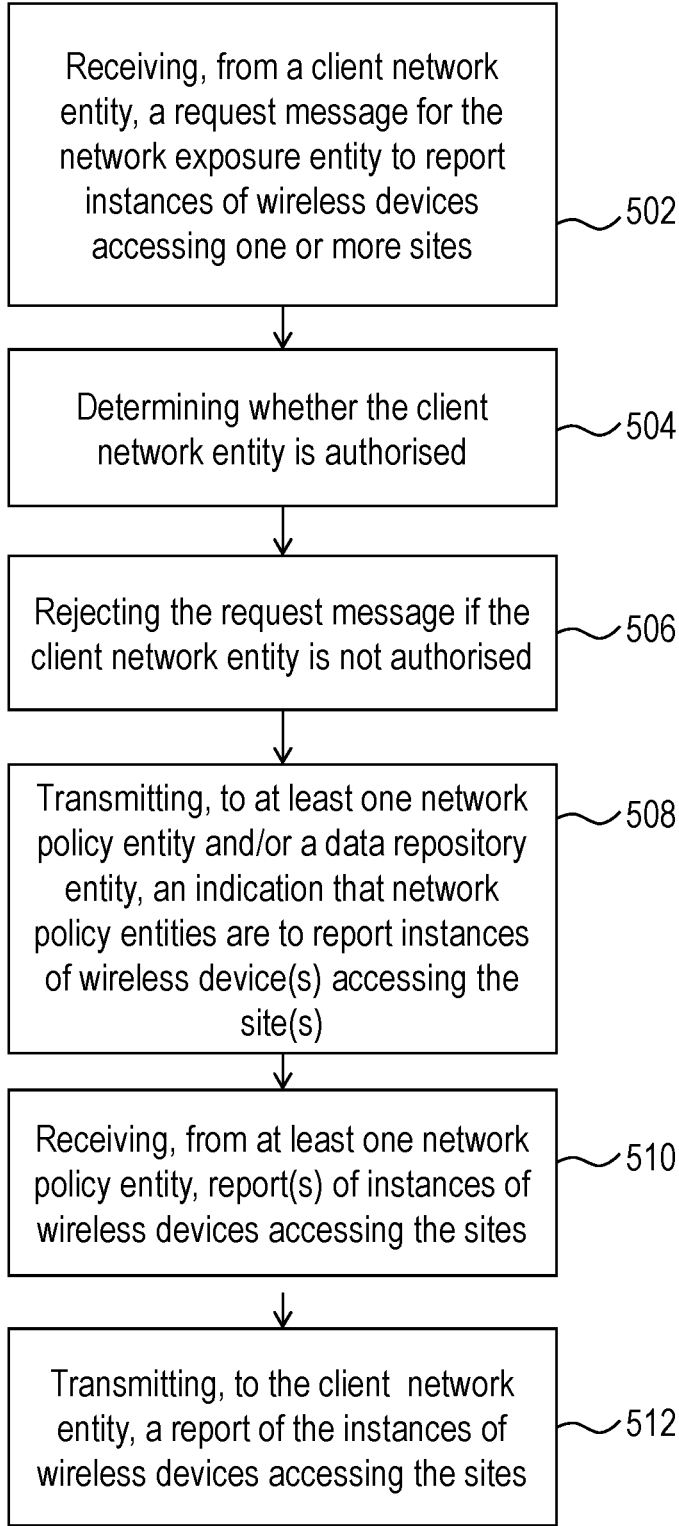

Receiving, from a client network entity, a request message for the network exposure entity to report instances of wireless devices accessing one or more sites ~502

Determining whether the client network entity is authorised ~504

Rejecting the request message if the client network entity is not authorised ~506

Transmitting, to at least one network policy entity and/or a data repository entity, an indication that network policy entities are to report instances of wireless device(s) accessing the site(s) ~508

Receiving, from at least one network policy entity, report(s) of instances of wireless devices accessing the sites ~510

Transmitting, to the client network entity, a report of the instances of wireless devices accessing the sites ~512

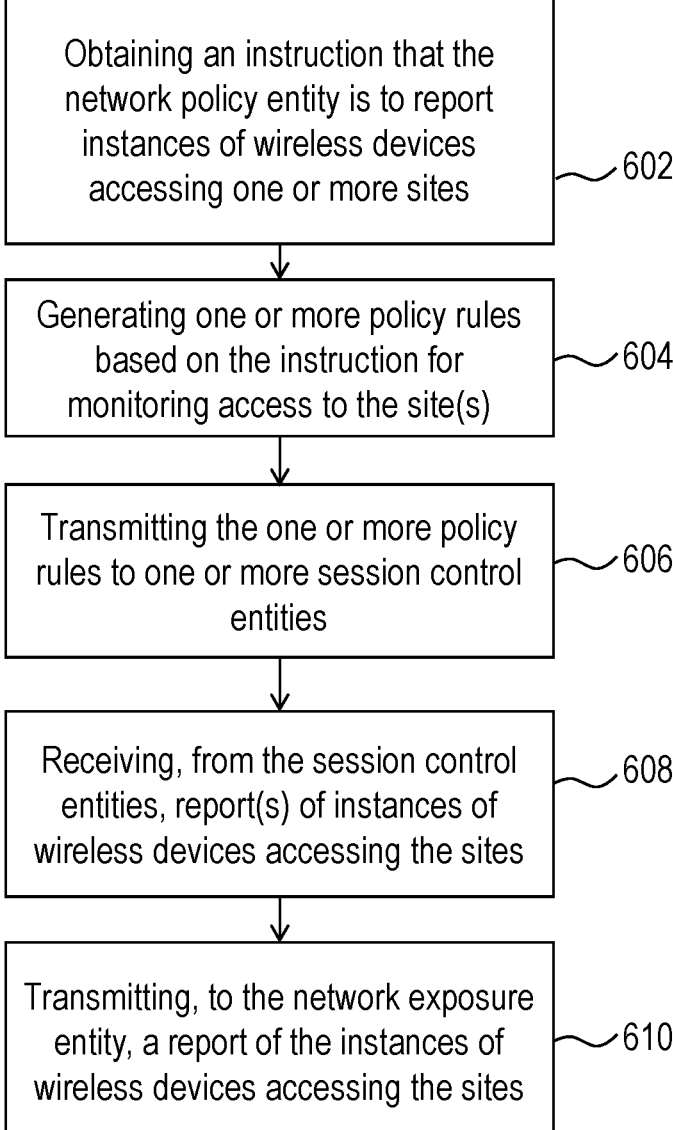

602   Obtaining an instruction that the network policy entity is to report instances of wireless devices accessing one or more sites 604   Generating one or more policy rules based on the instruction for monitoring access to the site(s)

606   Transmitting the one or more policy rules to one or more session control entities 608   Receiving, from the session control entities, report(s) of instances of wireless devices accessing the sites 610   Transmitting, to the network exposure entity, a report of the instances of wireless devices accessing the sites

Figure 7:
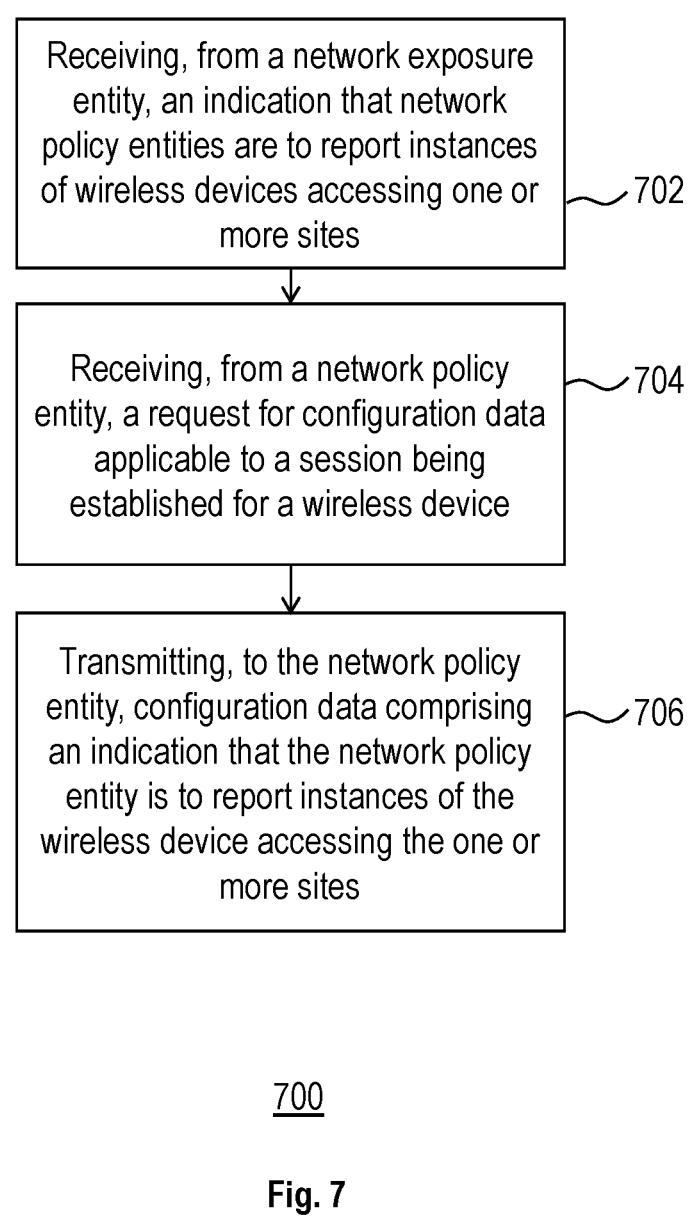

Receiving, from a network exposure entity, an indication that network policy entities are to report instances of wireless devices accessing one or more sites ~702

Receiving, from a network policy entity, a request for configuration data applicable to a session being established for a wireless device ~704

Transmitting, to the network policy entity, configuration data comprising an indication that the network policy entity is to report instances of the wireless device accessing the one or more sites ~706

METHODS, APPARATUS AND COMPUTER-READABLE MEDIUM FOR MONITORING SITE ACCESS OVER A MOBILE COMMUNICATION NETWORK

CROSS-REFERENCE TO RELATED APPLICATIONS

This application is a Submission Under 35 U.S.C. § 371 for U.S. National Stage Patent Application of International Application No.: PCT/EP2022/055545, filed Mar. 4, 2022 entitled "METHODS, APPARATUS AND COMPUTER-READABLE MEDIUM FOR MONITORING SITE ACCESS OVER A MOBILE COMMUNICATION NET-WORK," which claims priority to European Application No.: 22382038.2, filed Jan. 21, 2022, entitled "METHODS, APPARATUS AND COMPUTER-READABLE MEDIUM FOR MONITORING SITE ACCESS OVER A MOBILE COMMUNICATION NETWORK," the entireties of both of which are incorporated herein by reference.

TECHNICAL FIELD

Embodiments of the present disclosure relate to communication networks, and particularly to methods, apparatus and computer-readable mediums for monitoring site access.

BACKGROUND

Copyright infringement (also known as piracy) is the performance of certain restricted acts (e.g., copying, showing or playing to the public, etc) with respect to works protected by copyright law (e.g., musical and dramatic works, sound recordings, film, broadcast, etc) without permission from the rights holder. According to ABI Research (Combating Illegal Content Streaming and Piracy, April 2020), live streaming and live sport piracy in Europe alone cost legitimate copyright holders and licensees an estimated $941 million from 2019 to 2020.

The Third Generation Partnership Project (3GPP) has increased download data rates through features such as enhanced Mobile Broadband (eMBB), meaning that illegal streaming is increasingly taking place over mobile networks. However, no mechanism currently exists in mobile networks to track access to illegal streaming websites.

SUMMARY

Embodiments of the disclosure seek to address these and other problems.

A first aspect of the disclosure provides a method performed by a client network entity for monitoring access to one or more sites over a mobile communication network. The method comprises: transmitting, to a network exposure entity of the mobile communication network, a request message for the network exposure entity to report instances of one or more wireless devices accessing one or more sites over the mobile communication network; and receiving, from the network exposure entity, a report of instances of one or more wireless devices accessing the one or more sites over the mobile communication network.

Apparatus and a computer-readable medium for performing the method set out above are also provided. For example, there is provided a client network entity for monitoring access to one or more sites over a mobile communication network. The client network entity comprises processing circuitry and a non-transitory computer-readable medium storing instructions which, when executed by the processing circuitry, cause the client network entity to: transmit, to a network exposure entity of the mobile communication network, a request message for the network exposure entity to report instances of one or more wireless devices accessing one or more sites over the mobile communication network; and receive, from the network exposure entity, a report of instances of one or more wireless devices accessing the one or more sites over the mobile communication network.

A second aspect of the disclosure provides a method performed by a network exposure entity for monitoring access to one or more sites over a mobile communication network. The method comprises: receiving, from a client network entity, a request message for the network exposure entity to report instances of one or more wireless devices accessing one or more sites over the mobile communication network; and transmitting, to the client network entity, a report of instances of one or more wireless devices accessing the one or more sites over the mobile communication network.

Apparatus and a computer-readable medium for performing the method set out above are also provided. For example, there is provided a network exposure entity for monitoring access to one or more sites over a mobile communication network. The network exposure entity comprises processing circuitry and a non-transitory computer-readable medium storing instructions which, when executed by the processing circuitry, cause the network exposure entity to: receive, from a client network entity, a request message for the network exposure entity to report instances of one or more wireless devices accessing one or more sites over the mobile communication network; and transmit, to the client network entity, a report of instances of one or more wireless devices accessing the one or more sites over the mobile communication network.

A third aspect of the disclosure provides a method performed by a network policy entity for monitoring access to one or more sites over a mobile communication network. The method comprises: obtaining an instruction for the network policy entity to report, to a network exposure entity, instances of one or more wireless devices accessing one or more sites over the mobile communication network; and transmitting, to the network exposure entity, a report of instances of one or more wireless devices accessing the one or more sites over the mobile communication network.

Apparatus and a computer-readable medium for performing the method set out above are also provided. For example, there is provided a network policy entity for monitoring access to one or more sites over a mobile communication network. The network policy entity comprises processing circuitry and a non-transitory computer-readable medium storing instructions which, when executed by the processing circuitry, cause the network policy entity to: obtain an instruction for the network policy entity to report, to a network exposure entity, instances of one or more wireless devices accessing one or more sites over the mobile communication network; and transmit, to the network exposure entity, a report of instances of one or more wireless devices accessing the one or more sites over the mobile communication network.

A fourth aspect of the disclosure provides a method performed by a data repository entity for monitoring access to one or more sites over a mobile communication network. The method comprises: receiving, from a network exposure entity, an indication that network policy entities of the mobile communication network are to report instances of one or more wireless devices accessing one or more sites over the mobile communication network; receiving, from a network policy entity, a request for configuration data applicable to a session being established for a wireless device; and transmitting, to the network policy entity, configuration data comprising an indication that the network policy entity is to report, to the network exposure entity, instances of the wireless device accessing the one or more sites over the mobile communication network.

Apparatus and a computer-readable medium for performing the method set out above are also provided. For example, there is provided a data repository entity for monitoring access to one or more sites over a mobile communication network. The data repository entity comprises processing circuitry and a non-transitory computer-readable medium storing instructions which, when executed by the processing circuitry, cause the data repository entity to: receive, from a network exposure entity, an indication that network policy entities of the mobile communication network are to report instances of one or more wireless devices accessing one or more sites over the mobile communication network; receive, from a network policy entity, a request for configuration data applicable to a session being established for a wireless device; and transmit, to the network policy entity, configuration data comprising an indication that the network policy entity is to report, to the network exposure entity, instances of the wireless device accessing the one or more sites over the mobile communication network.

Embodiments of the disclosure thus provide a mechanism by which a network client entity (e.g., an application function) can request reports of wireless devices accessing one or more sites, such as those hosting illegal streaming, over a mobile communication network. Embodiments of the disclosure also provide mechanisms by which such access can be mitigated.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 5 is a flowchart of a method performed by a network exposure entity according to embodiments of the disclosure;

FIG. 6 is a flowchart of a method performed by a policy control entity according to embodiments of the disclosure;

FIG. 7 is a flowchart of a method performed by a data repository entity according to embodiments of the disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
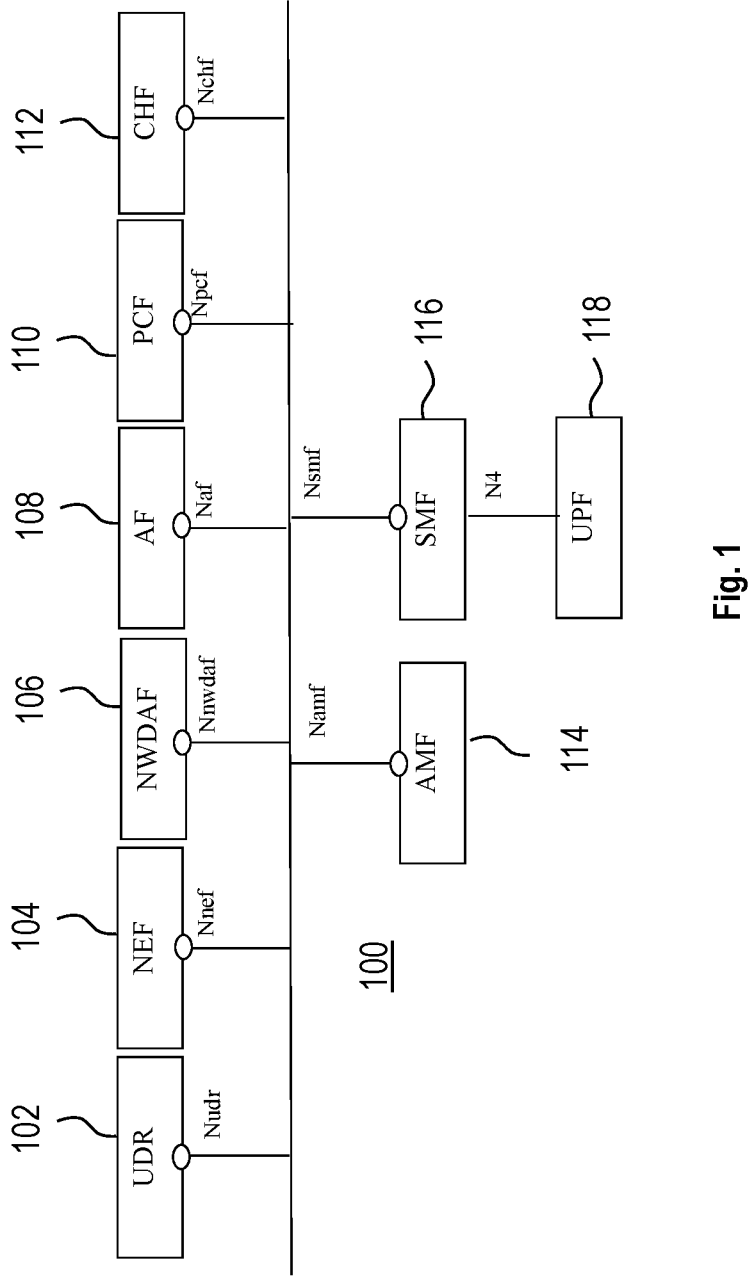
FIG. 1 shows the 5G reference architecture for the policy and charging control framework.
Figure 2A:
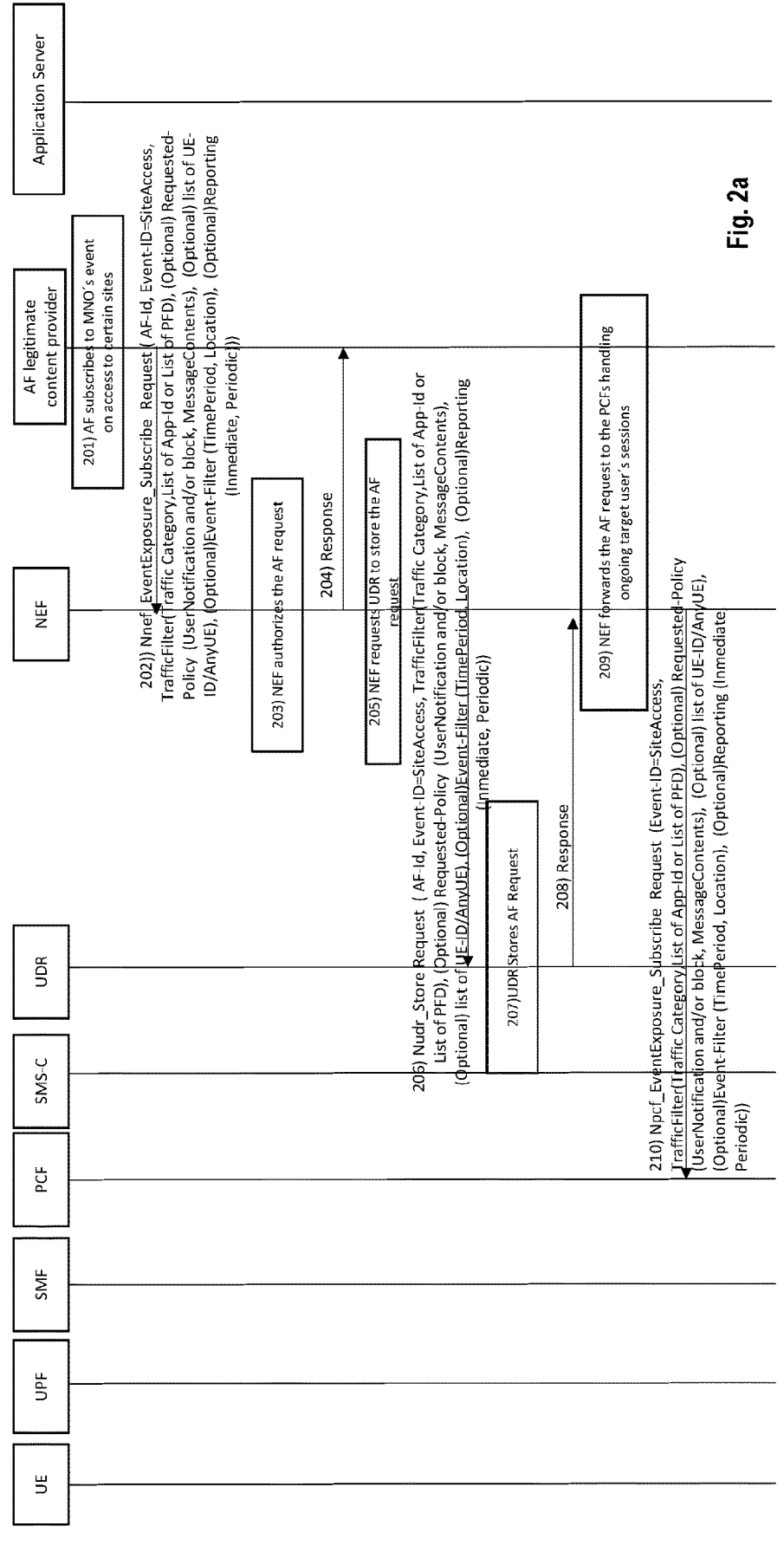
FIG. 2 is a signalling flow diagram for monitoring site access according to embodiments of the disclosure.
Figure 2B:
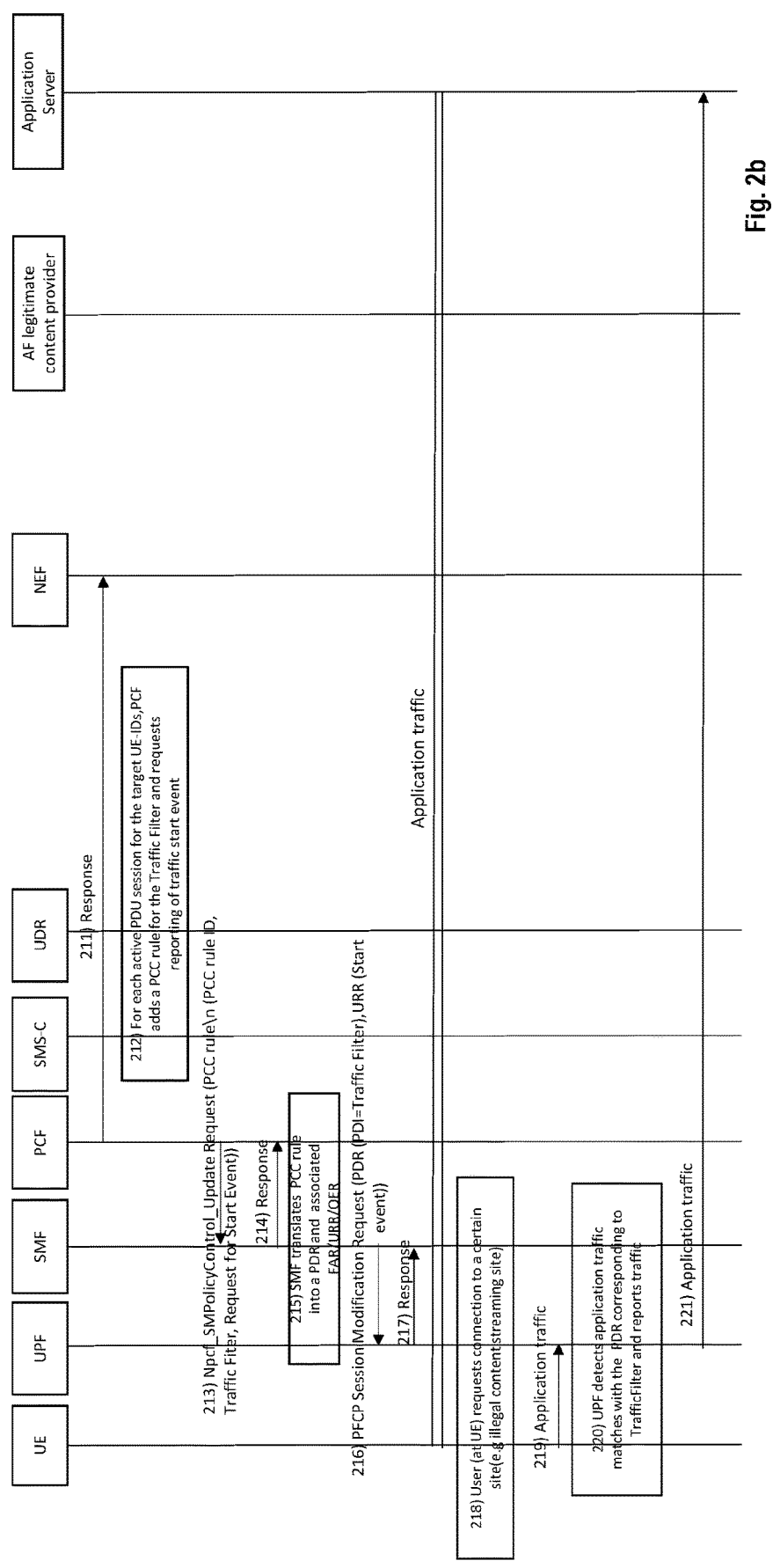
Figure 2C:
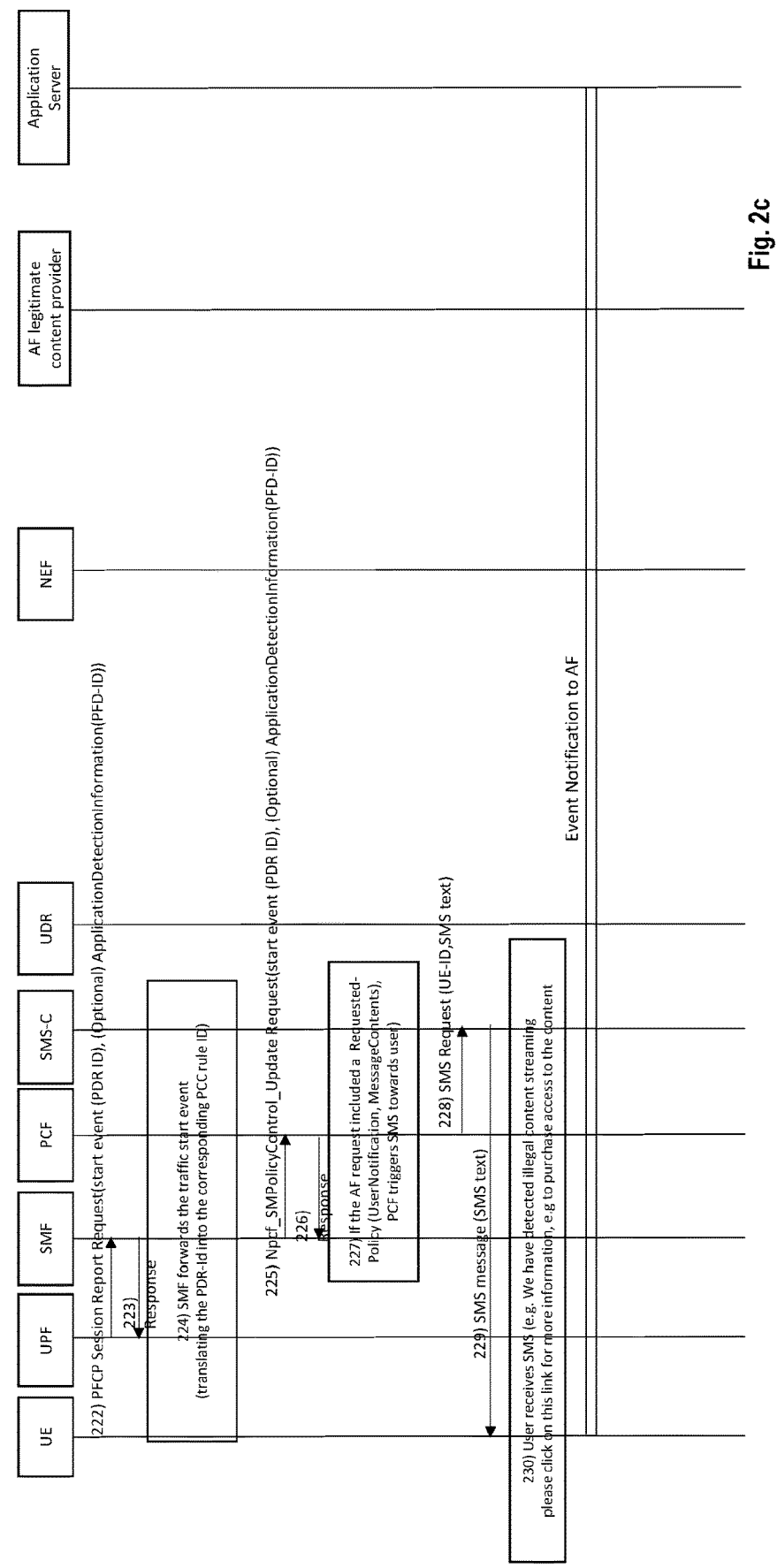
Figure 2D:
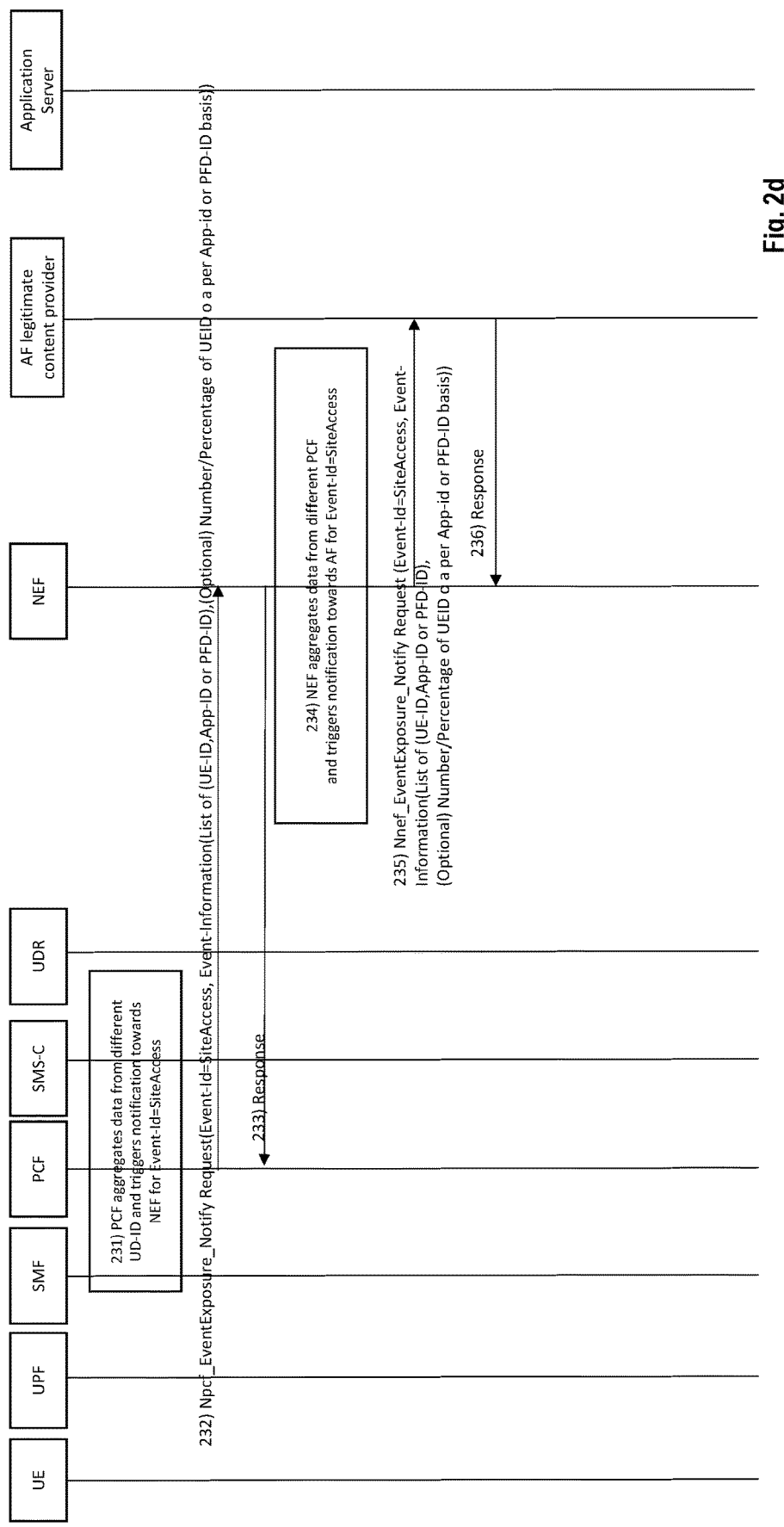

FIG. 1 depicts the 5G reference architecture 100 as defined by 3GPP, and particularly the policy and charging control framework.

The architecture comprises a Unified Data Repository (UDR) 102, a Network Exposure Function (NEF) 104, a Network Data Analytics Function (NWDAF) 106, an Application Function (AF) 108, a Policy Control Function (PCF) 110, a Charging Function (CHF) 112, an Access and Mobility Management Function (AMF) 114, a Session Management Function (SMF) 116 and a User Plane Function (UPF) 118.

The AF 108 interacts with the 3GPP Core Network (not illustrated), and specifically in the context of this disclosure, allows external parties, such as an AF, to use Exposure Application Programming Interfaces (APIs) offered by the network operator. Further details regarding the AF are set out below with respect to the signalling in FIG. 2, the method of FIG. 4, and the apparatus of FIG. 8.

The NEF 104 facilitates the exposure of different services and capabilities provided by the network functions and, specifically in the context of the present disclosure, supports different Exposure APIs. Further details regarding the NEF are set out below with respect to the signalling in FIGS. 2 and 3, the method of FIG. 5, and the apparatus of FIG. 8.

The UDR 102 stores data upon the instruction of other network functions in the network; it also provides network functions with access to that data. The data may be grouped into distinct collections of subscription-related information, including one or more of: subscription data; policy data; structured data for exposure; and application data. Further details regarding the UDR are set out below with respect to the signalling in FIGS. 2 and 3, the method of FIG. 7, and the apparatus of FIG. 8.

The PCF 110 supports a unified policy framework to govern network behaviour. Specifically, the PCF provides Policy and Charging Control (PCC) rules to the Policy and Charging Enforcement Function (PCEF). The PCEF may be implemented in the SMF and/or the UPF, and enforces policy and charging decisions according to provisioned PCC rules. Further details regarding the PCF are set out below with respect to the signalling in FIGS. 2 and 3, the method of FIG. 6, and the apparatus of FIG. 8.

In the context of the present disclosure, the SMF 116 receives PCC rules from the PCF and configures the UPF 118 to enable those rules to be monitored and enforced. The UPF 118 thus supports handling of user plane traffic based on the rules received from the SMF 116, e.g. by performing packet inspection and/or applying different enforcement actions (such as quality of service handling).

Those skilled in the art will be familiar with the network functions shown in FIG. 1 and described above. Further detail regarding the functions, responsibilities and actions of these network functions can be found in 3GPP technical specification 23.501, v 17.2.0. Those skilled in the art will further appreciate that the concepts described herein are applicable in mobile communication networks implementing different standards than the 5G system described with respect to FIG. 1.

For example, embodiments of the disclosure may be implemented in systems implementing a 4G architecture. In this case, the functions of the AF described herein may be performed by one or more of the service capability server (SCS) and/or the application server (AS); the functions of the NEF described herein may be performed by the service capabilities exposure function (SCEF); the functions of the UDR described herein may be performed by the subscription profile repository (SPR); the functions of the PCF described herein may be performed by the policy and charging rules function (PCRF); the functions of the SMF described herein may be performed by the packet data network gateway control plane (PGW-C) and/or the traffic detection function control plane (TDF-C); and the functions of the UPF described herein may be performed by the packet data network gateway user plane (PGW-U) and/or the traffic detection function user plane (TDF-U).

It will further be apparent to those skilled in the art that mobile communication networks implementing future standards may also implement embodiments of the present disclosure. For example, such future standards may define network functions or network entities that perform similar functions to the functions described above with respect to 5G or 4G systems. In such circumstances, it will be readily apparent how the embodiments of the disclosure may be adapted for implementation in systems implementing such future standards.

Embodiments of the disclosure provide methods, apparatus and computer-readable media enabling the monitoring and reporting of wireless devices accessing one or more sites (such as illegal streaming sites) over a mobile communication network. As used herein, the term "site" is to be understood as meaning any website, internet site, server, media server or similar, and may be used interchangeably with any of those terms.

Figure 3:
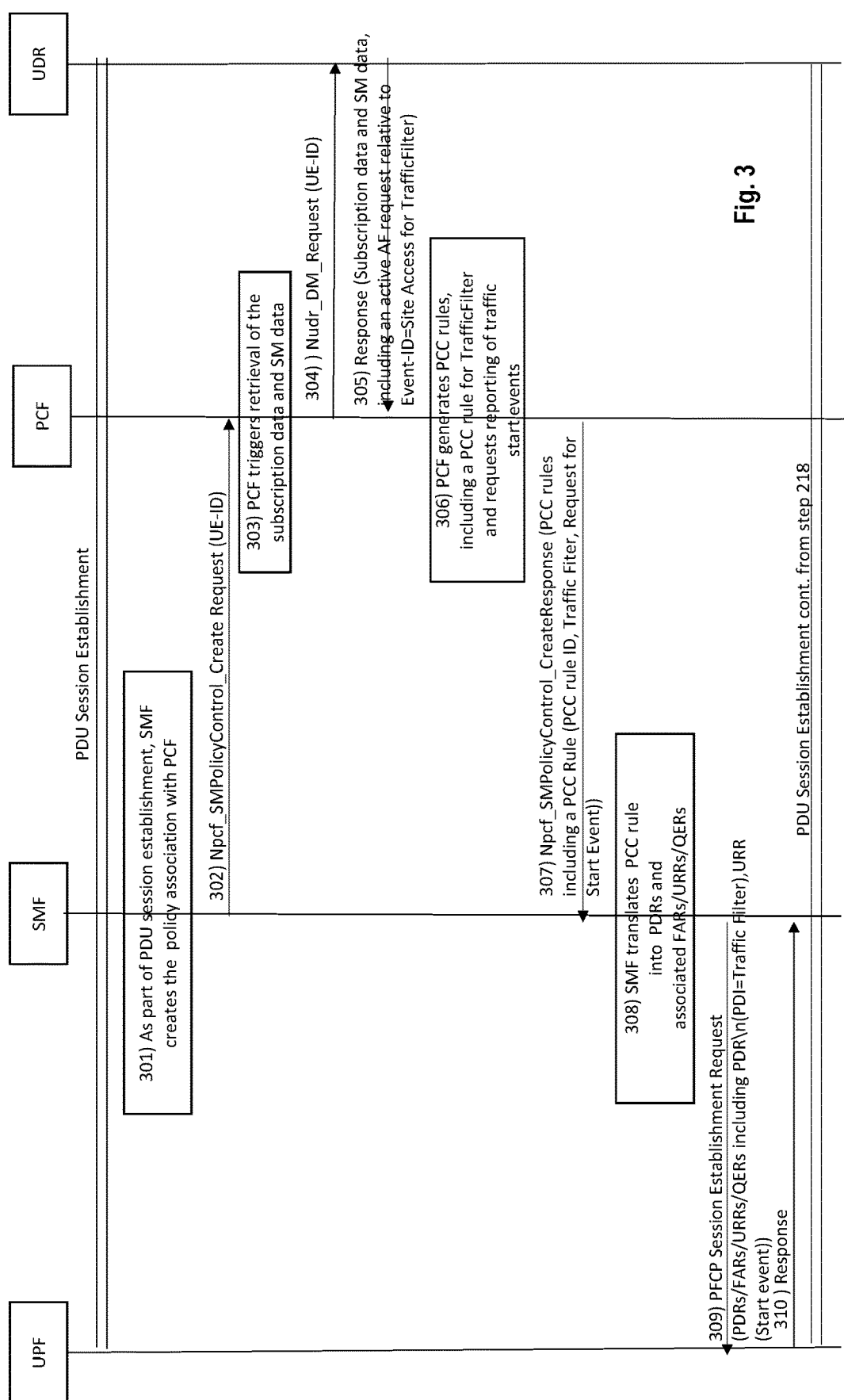
FIG. 3 is a signalling flow diagram for monitoring site access according to further embodiments of the disclosure.

FIGS. 2 and 3 are signalling flow diagrams for monitoring site access according to embodiments of the disclosure. The signalling flow in FIG. 2 is particularly adapted for monitoring site access by wireless devices configured with ongoing protocol data unit (PDU) sessions when the request to monitor site access is first implemented; the signalling flow in FIG. 3 is particularly adapted for monitoring site access by wireless devices establishing new PDU sessions while a request to monitor site access is already active. Both methods are described below in the context of monitoring access to one or more sites that are distributing illegal streams of copyrighted media content. However, those skilled in the art will appreciate that the methods below enable the monitoring of access to any site.

In steps 201 and 202, the AF (e.g. legitimate content owner) subscribes to receive notifications or reports of instances of wireless devices accessing one or more sites over a mobile communication network. The mobile communication network may correspond to a network run by a mobile network operator (MNO). Thus, in step 202, the AF transmits, to the NEF, a request message for the NEF to report instances of one or more wireless devices (e.g., UEs) accessing one or more sites over the mobile communication network. In the illustrated embodiment, the request message comprises a request to subscribe to receive reports from the NEF of instances of one or more wireless devices accessing the one or more sites over the mobile communication network (e.g., as a Nnef_EventExposure_Subscribe Request message). In other embodiments, the request message may comprise a request to receive a report of wireless devices accessing the one or more sites over the mobile communication network without subscribing to such a service.

According to embodiments of the disclosure, a new event may be defined which is monitored by the network e.g., the event of a wireless device accessing a site. Thus, in one embodiment, the request message may comprise an indication of the event which is to be monitored (e.g., Event-ID=SiteAccess).

The request message may further comprise information enabling traffic to the one or more sites to be identified (e.g., a traffic filter). For example, the information or traffic filter may comprise one or more of: a packet flow description (PFD); a category of traffic (e.g., streaming); one or more source or destination network addresses for the sites; and an application identifier (AppID) associated with the traffic. A PFD is a set of information enabling application traffic to be identified (e.g., as defined in 3GPP TS 23.682 v 17.1.0). The set of information may comprise one or more of: an identifier for the PFD; a 3-tuple comprising protocol, server-side IP address and port number; and domain name matching criteria (e.g., one or more significant parts of the URL to be matched, such as host name, etc) and information about applicable protocol(s).

The request message may further comprise an event filter defining one or more additional criteria that are to be fulfilled for the site access to be monitored and/or reported to the AF. For example, the event filter may comprise an indication of one or more time periods in which access to the site is to be monitored. The time period(s) may be chosen to cover one or more events which are expected to increase illegal streaming (e.g., sporting events, music events, etc). Alternatively, the absence of an indication of a time period may be interpreted implicitly as a request to monitor access to the site until the subscription expires, until an instruction to stop monitoring access to the site is received, etc.

The event filter may further comprise an indication of a geographical area in which access to the sites shall be monitored. For example, the network may be configured to monitor only wireless devices within a certain geographical area, such as a particular country or part of a country.

The request message may further comprise an indication of the identities of one or more wireless devices which are to be monitored. For example, particular wireless devices may be suspected of accessing illegal streaming sites; such devices can be identified in the request message so that only these wireless devices are monitored by the network.

The request message may further comprise a reporting configuration according to which the NEF should report the instances of the wireless devices accessing the sites. For example, the reporting configuration may comprise one or more of: an indication of the information which should be reported to the AF; and an indication of the timing of reports transmitted to the AF. The information to be reported may comprise one or more of: the identities of the wireless devices which accessed the sites; and statistics of the site access, such as the number of times the sites were accessed, the percentage of users that accessed the sites, etc. The timing of reports may be periodic, or immediately upon access to the sites being detected (or a threshold number of site accesses being detected, etc). The reporting configuration may further comprise information necessary for the reports to be transmitted to the AF, such as the identity of the AF.

In further embodiments, the request message comprises an indication of a policy configuration comprising actions which are to be taken following detection of one or more site accesses. The actions may be designed to mitigate access to the one or more sites by the wireless devices. For example, the policy configuration may comprise one or more of: an indication that further access to the one or more sites by the wireless devices that are detected to have already accessed the sites is to be blocked; an indication that access to the one or more sites is to be blocked for all wireless devices; an indication that a message, e.g., a short message service (SMS) message, is to be transmitted to the one or more wireless devices informing users that their access of the one or more sites has been recorded.

In step 203, the NEF authorizes the AF request received in step 202. For example, the NEF may verify that the client associated with the AF identity specified in the request message is authorised to trigger the monitoring of sites by wireless devices. In step 204, the NEF transmits a response message to the AF indicating successful authorisation (or denying the request if the authorisation was unsuccessful).

In steps 205 and 206, the NEF transmits a request message to the UDR comprising a request for the UDR to store information relating to the request message received from the AF. The request message transmitted to the UDR may comprise a Nudr_Store Request message. For example, the request message may comprise a request for the UDR to store some or all of the data included in the request message received from the AF. Thus, the request message transmitted to the UDR may comprise one or more of: an indication of the subscription and the events which are to be monitored; a traffic filter; a policy configuration; a list of wireless device identities; an event filter; and a reporting configuration.

In step 207, the UDR stores the information in its database and, in step 208, the UDR transmits a response message to the NEF to indicate successful operation, i.e., that the information has been successfully stored.

In steps 209 and 210, the NEF transmits, to at least one PCF, an indication that the PCF is to report, to the NEF, instances of one or more wireless devices accessing the one or more sites over the mobile communication network. The indication may be contained in a request message such as a Npcf_EventExposure_Subscribe Request message. The request message may further comprise some or all of the information contained in the request message received from the AF in step 202. Thus the request message transmitted to the at least one PCF may comprise one or more of: an indication of the subscription and the events which are to be monitored; a traffic filter; a policy configuration; a list of wireless device identities; an event filter; and a reporting configuration.

As noted above, the signalling in FIG. 2 provides a mechanism for monitoring access to one or more sites over the mobile communication network by UEs particularly having PDU sessions which are ongoing at the time the request to monitor site access is initiated. The request message may therefore be transmitted to PCFs which are handling ongoing PDU sessions. Where the request from the AF specifies the identities of one or more wireless device to be monitored, the request message may be transmitted to the PCFs handling ongoing PDU sessions for those wireless devices. Alternatively, if the request from the AF does not specify specific wireless device identities, the request may (implicitly) be interpreted as applying to all wireless devices. Thus the request message may be transmitted to all PCFs in the mobile communication network handling ongoing PDU sessions.

In step 211, the PCF transmits a response message to the NEF to indicate successful operation, i.e., that the information has been successfully received at the PCF.

In steps 212 and 213, for each active PDU session (e.g., for those wireless devices identified in the message received in step 210, or for all wireless devices if no wireless devices are identified), the PCF determines a rule (e.g., a PCC rule) for the traffic to or from the one or more sites (e.g., as identified by the traffic filter) and transmits a request message to the SMFs requesting the reporting of traffic start events meeting the traffic filter. For example, the request message may comprise a Npcf_SMPolicyControl_Update Request message. The request message may comprise one or more of: an identity of the PCC rule; an indication of the traffic filter enabling traffic to or from the one or more sites to be identified; and an indication of the events to be reported (e.g., the start of traffic to or from the sites).

In step 214, the SMF transmits a response message to the PCF to indicate successful operation, i.e., that the request message was successfully received in step 213.

In step 215, the SMF translates the PCC rule received in step 213 defines into a packet detection rule (PDR) and an associated usage reporting rule (URR), forwarding action rule (FAR) and quality-of-service enforcement rule (QER). The PDR contains information required to classify a packet arriving at a UP function. For example, the information may comprise one or more of: source information, a service data flow filter and an application identity. In some embodiments, the PDR may include the traffic filter to enable traffic to or from the one or more sites to be identified. The associated URR describes how the UP function should report traffic detected according to the PDR, e.g., on start of the traffic to or from the one or more sites. Not strictly relevant to embodiments of the disclosure (i.e., for monitoring access to one or more sites), the FAR defines how packets should be forwarded by the UPF and the QER defines how packets should be marked for quality-of-service (QOS) measurement and enforcement.

In step 216, the SMF transmits a request message to the UPF requesting that the UPF report traffic according to the PDR and the URR. The request message may therefore comprise indications of the PDR and the URR. The request message may comprise a PFCP Session Modification Request message. In step 217, the UPF responds with an acknowledgement message indicating successful operation, e.g., that the request message was successfully received in step 216 and that the PDR and URR have been implemented.

Thus the signalling in steps 201 to 217 of FIG. 2 provides a method by which rules can be established in a mobile communication network to monitor access to one or more sites. Steps 218 to 230 describe further signalling in which access to one or more sites is detected and one or more policies are implemented to mitigate the access to the site(s).

In step 218, a UE requests connection to a particular site (e.g., an illegal content streaming site) which is subject to the monitoring set up in steps 201 to 217. In step 219, application traffic for the connection is transmitted from the UE to the UPF.

In step 220, the UPF detects application traffic matching the PDR corresponding to the traffic filter as the traffic is directed to a site which is subject to monitoring. In step 221, the application traffic is forwarded to the application server associated with the site in accordance with normal UPF operation. Separately, in step 222, the UPF transmits a report message to the SMF indicating that traffic to the site has been detected. For example, the report message may comprise an indication that traffic to the site has started. The report message may comprise a PFCP Session Report Request message including the traffic start event for PDR-ID. The report message may further comprise Application Detection Information comprising further information about the traffic, such as one or more of: an identity of the UE; and an amount of traffic that has been transmitted between the UE and the site. In step 223, the SMF transmits an acknowledgement message to the UPF to indicate successful receipt of the information in step 222.

In step 224, the SMF translates the PDR ID into a corresponding PCC rule ID, and transmits a report message to the PCF in step 225. The report message comprises an indication that the site has been accessed by the UE, and thus may comprise an indication of the PCC rule ID. As in step 222, the report message may further comprise Application Detection Information comprising further information about the traffic, such as one or more of: an identity of the UE; and an amount of traffic that has been transmitted between the UE and the site. In step 226, the PCF transmits an acknowledgement message to the SMF.

Thus the PCF receives one or more reports of UEs accessing the sites in accordance with the monitoring rules established in steps 201 to step 217. As noted above, the AF may define one or more policies which are to be implemented upon detection of traffic to or from the one or more sites. One such policy is for a message (such as an SMS message) to be transmitted to the UE to indicate that the UE's access of the one or more sites has been detected. In this way, a human user of the UE will be encouraged to cease their access to the site. Steps 227 to 230 describe implementation of one such policy according to embodiments of the disclosure.

Thus in steps 227 and 228, responsive to the request message from the AF in step 202 (and thus the request message from the NEF to the PCF in step 210) comprising an indication of such a policy, the PCF triggers an SMS message to be transmitted to the UE. The PCF transmits a request message to the short message service centre (SMS-C) requesting the SMS-C to transmit a SMS to the UE. The request message comprises an indication of the UE identity, and an indication of the message contents. The message contents may comprise a message informing the user that their access to the site has been detected, or providing a link to an authorised version of the media content, e.g., "We have detected illegal content streaming, please click on this link for more information, e.g. to purchase access to the content", or "We have detected illegal content streaming for a LaLiga football match, please click on this link to subscribe to Movistar LaLiga"). In step 229 the SMS-C transmits an SMS message to the UE with the indicated content, and this is received by the user in step 230.

Steps 231 to 236 describe signalling by which the traffic to the one or more sites, detected in steps 218 to 226, is reported to the AF.

In step 231, optionally, the PCF aggregates data relating to multiple accesses by wireless devices to the one or more sites, and in step 232 transmits towards the NEF a report message comprising event information relating to the access of the one or more sites by the wireless devices. For example, the PCF may aggregate data periodically, or once a threshold number of events have been detected. The aggregated data may relate to site access by one or multiple wireless devices.

The report message may comprise an indication of the event ID to which the report message pertains (e.g., Event-ID=SiteAccess) and information relating to the access of the one or more sites by the one or more wireless devices. The information may correspond to the requested reporting configuration received in step 210. For example, the information may comprise a list of the wireless devices which accessed the site, a list of application identities which accessed the site, and/or a list of PFD identities which were used to access the site. The information may comprise statistics relating to the access of the one or more sites by the one or more wireless devices, such as a number of wireless devices or a percentage of active wireless devices that accessed the one or more sites. These statistics may be provided on an aggregate basis, per App-ID or per PFD.

In step 233, the NEF transmits an acknowledgement message confirming receipt of the report message from the PCF.

The NEF may in general receive such report messages from more than one PCF instance, and thus in step 234 the NEF aggregates data from the multiple PCF instances. The data may be aggregated periodically (e.g., as requested by the AF in the request message received in step 202) or once a threshold amount of data has been received, for example.

In step 235, the NEF transmits a report message to the AF comprising a report of instances of one or more wireless devices accessing the one or more sites over the mobile communication network. Were the NEF aggregates data from multiple PCF instances in step 234, the report message may comprise reports of instances from those multiple PCF instances. The report message may comprise an indication of the event ID to which the report message pertains (e.g., Event-ID=SiteAccess) and information relating to the access of the one or more sites by the one or more wireless devices. The information may correspond to the requested reporting configuration received in step 202. For example, the information may comprise a list of the wireless devices which accessed the site, a list of application identities which accessed the site, and/or a list of PFD identities which were used to access the site. The information may comprise statistics relating to the access of the one or more sites by the one or more wireless devices, such as a number of wireless devices or a percentage of active wireless devices that accessed the one or more sites. These statistics may be provided on an aggregate basis, per App-ID or per PFD. In step 236, the AF transmits an acknowledgement message to the NEF indicating successful receipt of the report message.

As noted above, FIG. 2 provides signalling by which access to one or more sites by one or more wireless devices over a mobile communication network can be monitored, particularly for PDU sessions that are on-going at the time the request to monitor site access is initiated. FIG. 3 is a signalling diagram showing the steps of a process by which access to one or more sites by one or more wireless devices over a mobile communication network can be monitored, for PDU sessions that are initiated while a request to monitor site access is already active.

FIG. 3 shows only those steps which differ from the signalling in FIG. 2. Thus the signalling in FIG. 3 assumes that a request to monitor site access has already been received and implemented on the mobile communication network according to steps 201 to 208 described above. At this point, the UDR has received and stored in its database (in steps 206 and 207) one or more of: an indication of the subscription and the events which are to be monitored; a traffic filter; a policy configuration; a list of wireless device identities; an event filter; and a reporting configuration.

Further, the signalling shown in FIG. 3 is implemented as part of a PDU session establishment or re-establishment process. For brevity, only the signalling relevant to embodiments of the present disclosure is shown, i.e., methods of monitoring site access.

In step 301, as part of PDU session establishment, the SMF creates an association with a PCF for the PDU session. In particular, in step 302, the SMF transmits a request message to a PCF requesting a policy association for the PDU session. The request message comprises an indication of the wireless device identity (UE-ID). The request message may comprise a Npcf_SMPolicyControl_Create Request message.

In step 303, the PCF triggers retrieval of the subscription data for the wireless device and session management (SM)

data. In particular, in step 304, the PCF transmits a request message to the UDR, requesting the subscription data and/or SM data. The request message may comprise an indication of the wireless device identity (UE-ID). The request message may comprise a Nudr_DM_Request message.

In step 305, the UDR transmits a response message including subscription data and SM data corresponding to the UE-ID session. As noted above, and in accordance with embodiments of the disclosure, the SM data includes an active AF request to monitor site access (e.g., Event-ID=SiteAccess for TrafficFilter). The SM data may include such an active AF request responsive to a determination by the UDR that the UE-ID is on a list of identities for which site access is to be monitored, or responsive to a determination by the UDR that site access is to be monitored for all UE-IDs.

Thus the PCF receives an indication that the PCF is to report, to a NEF, instances of the wireless device accessing the one or more sites over the mobile communication network. The SM data may further comprise some or all of the information contained in the request message received from the AF in step 202 and stored in the UDR database in step 207. Thus the SM data may comprise one or more of: an indication of the subscription and the events which are to be monitored; a traffic filter; a policy configuration; an event filter; and a reporting configuration. Note that the SM data may not comprise a list of wireless device identities as the rules for monitoring site access need only be established for the wireless device involved with the PDU session establishment.

Thereafter, steps 306 to 310 correspond substantially to steps 212 to 217 but for a new PDU session. In step 306 (which may correspond to step 212), the PCF generates one or more PCC rules for the PDU session, particularly including at least one PCC rule enabling traffic to or from the one or more sites to be detected (e.g., based on the Traffic Filter) and requesting reporting of traffic corresponding to the traffic filter. For example, the PCC rule may request reporting once traffic corresponding to the traffic filter starts. In step 307, the PCF transmits a request message to the SMF comprising an indication of the PCC rules. The request message may comprise one or more of: a PCC rule ID, TrafficFilter, Request for Start event. The request message may comprise a Npcf_SMPolicyControl_Create Response message (note that this request message requests creation of policy control, rather than updates to policy control for an on-going PDU session, as in step 213).

In step 308 (which may correspond to step 215), the SMF translates the received PCC rules into PDRs and associated FARs/URRs/QERs. In step 309 (which may correspond to step 216), a request message is transmitted from the SMF to the UPF, comprising an indication of the PDRs and associated FARs/URRs/QERs. In particular, the request message may a PDR enabling traffic to or from the one or more sites to be detected (PDI=TrafficFilter) and an associated URR requesting that the UPF report when traffic meeting the PDR starts. The request message may comprise a PFCP Session Establishment Request message. In step 310, the UPF responds with an acknowledgement message to indicate successful receipt of the request message and implementation of the PDRs, etc.

Thus FIG. 3 shows signalling by which rules for monitoring site access by a wireless device can be implemented for a newly established PDU session. After step 310, the signalling may proceed as described above with respect to steps 218 to 236.

Figure 4:
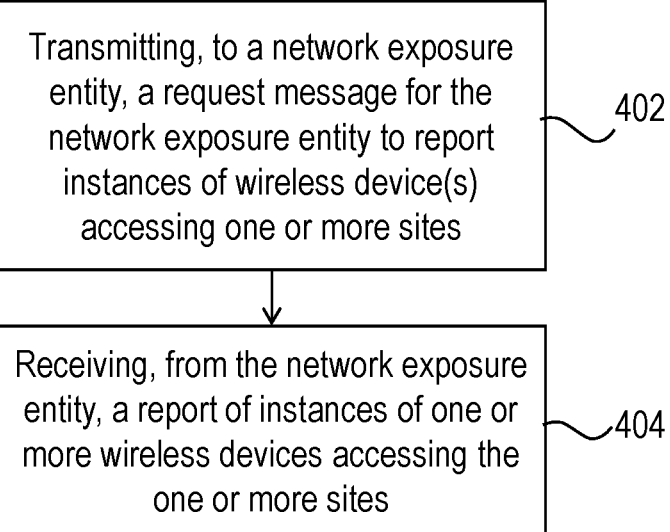
FIG. 4 is a flowchart of a method performed by a client network entity according to embodiments of the disclosure.

FIG. 4 is a flowchart of a method 400 performed by a client network entity according to embodiments of the disclosure. The client network entity may correspond to an AF, a SCS, an AS or analogous network entity or function (such as the AF 108 described above with respect to FIG. 1). Alternatively, the client network entity may correspond to a client server which is communicatively coupled to such an AF, SCS, AS or analogous entity. In some embodiments, the steps of the method described with respect to FIG. 4 may correspond to the signalling of the AF shown above in FIG. 2 and/or FIG. 3.

In step 402, the client network entity transmits, to a network exposure entity of the mobile communication network (such as a NEF, SCEF, etc), a request message for the network exposure entity to report instances of one or more wireless devices accessing one or more sites over the mobile communication network. In some embodiments step 402 may correspond to step 202, described above with respect to FIG. 2.

The request message may comprise information enabling traffic to the one or more sites to be identified (e.g., a traffic filter). For example, the information or traffic filter may comprise one or more of: a packet flow description for traffic to or from the one or more sites; one or more source or destination network addresses corresponding to the one or more sites; an application identifier (App-ID); a category of traffic to or from the one or more sites. The packet flow description (PFD) may contain IP addresses of the sites to be monitored, as well as other data (see above). The application identifier may be utilized to identify traffic if the client network entity provisions the PFD using an Nnef_PFDManagement procedure, for example. The category of traffic (e.g., TrafficCategory—"Video streaming") may also be useful to identify data which may be of concern (e.g., due to illegal piracy).

The request message may additionally or alternatively comprise an event filter indicating one or more circumstances in which access to the one or more sites over the mobile communication network is to be monitored. Examples of such circumstances may include one or more of: a time period in which access to the one or more sites over the mobile communication network is to be monitored; a geographical location of wireless devices that are to be monitored for access to the one or more sites; and identities of one or more wireless devices that are to be monitored for access to the one or more sites.

The request message may additionally or alternatively comprise a reporting configuration for the network exposure entity to report to the client network entity. The reporting configuration may comprise one or more of: an indication of information to be included in the reports to the client network entity; and an indication of timing of reports to be transmitted by the network exposure entity to the client network entity.

The request message may additionally or alternatively comprise a policy configuration comprising an indication of one or more actions to be performed by the mobile communication network to mitigate access to the one or more sites by the one or more wireless devices. Examples of possible policy configurations may include one or more of: an indication that access to the one or more sites by the one or more wireless devices is to be blocked; an indication that access to the one or more sites is to be blocked for all wireless devices; an indication that a message is to be transmitted to the one or more wireless devices informing users of the one or more wireless devices that their access of the one or more sites has been recorded.

The request message may comprise a request to subscribe to receive one or more reports of an event, with the event being defined as access by one or more wireless devices to the one or more sites. Alternatively, the request message may comprise a one-off request for a report of such an event.

In step 404 the client network entity receives, from the network exposure entity, a report of instances of one or more wireless devices accessing the one or more sites over the mobile communication network. In some embodiments step 404 may correspond to step 235, described above with respect to FIG. 2.

FIG. 5 is a flowchart of a method 500 performed by a network exposure entity according to embodiments of the disclosure. The network exposure entity may correspond to a NEF, a SCEF or analogous network entity or function (such as the NEF 104 described above with respect to FIG. 1). In some embodiments, the steps of the method described with respect to FIG. 5 may correspond to the signalling of the NEF shown above in FIG. 2 and/or FIG. 3.

In step 502, the network exposure entity receives, from a client network entity (such as an AF), a request message for the network exposure entity to report instances of one or more wireless devices accessing one or more sites over the mobile communication network. In some embodiments step 502 may correspond to step 202, described above with respect to FIG. 2.

In step 504, the network exposure entity determines whether the client network entity is authorised to make such a request. For example, the network exposure entity may verify that the client associated with an AF identity specified in the request message is authorised to trigger the monitoring of sites by wireless devices. In some embodiments step 504 may correspond to step 203, described above with respect to FIG. 2.

In step 506, responsive to a determination that the client network entity is not authorised to make the request, the network exposure entity may reject the request by the client network entity. The network exposure entity may transmit a response message to the client network entity rejecting the request, or otherwise ignore the request. Otherwise, responsive to a determination that the client network entity is authorised, the network exposure entity may transmit a response message to the client network entity indicating successful authorisation. In some embodiments step 506 may correspond to step 204, described above with respect to FIG. 2.

In step 508, the network exposure entity transmits, to at least one network policy entity (such as a PCF or PCRF) and/or a data repository entity (such as a UDR or SPR), an indication that network policy entities are to report, to the network exposure entity, instances of one or more wireless devices accessing the one or more sites over the mobile communication network.

Thus, the network exposure entity may transmit, to at least one network policy entity, an indication that the at least one network policy entity is to report instances of one or more wireless devices accessing the one or more sites over the mobile communication network. The request message received in step 502 may comprise an indication of identities for the one or more wireless devices, in which case the indication in step 508 may be transmitted to those network policy entities determined to be serving the identified one or more wireless devices.

In some embodiments step 508 may correspond to steps 206 and/or 210, described above with respect to FIG. 2.

In step 510, the network exposure entity receives, from the at least one network policy entity of the mobile communication network, a report of instances of one or more wireless devices accessing the one or more sites over the mobile communication network. In some embodiments step 510 may correspond to step 232, described above with respect to FIG. 2.

In step 512 the network exposure entity transmits, to the client network entity, a report of instances of one or more wireless devices accessing the one or more sites over the mobile communication network.

The indication in step 508 may be transmitted to multiple network policy entities, and therefore reports may be received in step 510 from multiple entities. In such a case, the report transmitted in step 512 may comprise data aggregated from the multiple reports received in step 510.

The report may comprise one or more of: a list of instances of wireless devices accessing the one or more sites; a list of identities of wireless devices that accessed the one or more sites; and statistical information relating to access of the one or more sites by wireless devices over the mobile communication network.

In some embodiments, step 512 may correspond to step 235, described above with respect to FIG. 2.

FIG. 6 is a flowchart of a method 600 performed by a policy control entity according to embodiments of the disclosure. The policy control entity may correspond to a PCF, a PCRF or analogous network entity or function (such as the PCF 110 described above with respect to FIG. 1). In some embodiments, the steps of the method described with respect to FIG. 6 may correspond to the signalling of the PCF shown above in FIG. 2 and/or FIG. 3.

In step 602, the network policy entity obtains an instruction for the network policy entity to report, to a network exposure entity, instances of one or more wireless devices accessing one or more sites over the mobile communication network.

The instruction may be received from a network exposure entity, and may comprise an instruction to report instances of one or more wireless devices accessing one or more sites over the mobile communication network in respect of one or more ongoing sessions. Alternatively or additionally, the instruction may be received, during session establishment for a wireless device, from a data repository entity of the mobile communication network, and may comprise an instruction to report, to a network exposure entity, instances of one or more wireless devices accessing one or more sites over the mobile communication network. In some embodiments step 602 may correspond to step 210, described above with respect to FIG. 2, or step 305 described above with respect to FIG. 3.

In step 604, the network policy entity generates one or more policy rules (e.g., PCC rules) based on the instruction for monitoring access to the one or more sites. In some embodiments step 604 may correspond to step 212, described above with respect to FIG. 2, or step 306 described above with respect to FIG. 3.

In step 606, the network policy entity transmits the one or more policy rules to one or more session control entities (e.g., SMF, PGW-C, TDF-C, etc) of the mobile communication network to enable access of the one or more sites to be monitored. In some embodiments step 606 may correspond to step 213, described above with respect to FIG. 2, or step 307 described above with respect to FIG. 3.

In step 608, the network policy entity receives, from the at least one session control entity of the mobile communication network, a report of instances of one or more wireless devices accessing the one or more sites over the mobile communication network. In some embodiments step 608 may correspond to step 225, described above with respect to FIG. 2.

In step 610, the network policy entity transmits, to the network exposure entity, a report of instances of one or more wireless devices accessing the one or more sites over the mobile communication network. The report may comprise one or more of: a list of instances of wireless devices accessing the one or more sites; a list of identities of wireless devices that accessed the one or more sites; and statistical information relating to access of the one or more sites by wireless devices over the mobile communication network. In some embodiments step 610 may correspond to step 232, described above with respect to FIG. 2.

FIG. 7 is a flowchart of a method 700 performed by a data repository entity according to embodiments of the disclosure. The data repository entity may correspond to a UDR, an SPR or analogous network entity or function (such as the UDR 102 described above with respect to FIG. 1). In some embodiments, the steps of the method described with respect to FIG. 7 may correspond to the signalling of the UDR shown above in FIG. 2 and/or FIG. 3.

In step 702, the data repository entity receives, from a network exposure entity (such as a NEF, SCEF, etc), an indication that network policy entities of the mobile communication network are to report instances of one or more wireless devices accessing one or more sites over the mobile communication network. In some embodiments step 702 may correspond to steps 206 and 207, described above with respect to FIG. 2.

In step 704, the data repository entity receives, from a network policy entity (e.g., PCF, PCRF, etc), a request for configuration data applicable to a session being established for a wireless device. In some embodiments step 704 may correspond to step 304, described above with respect to FIG. 3.

In step 706, the data repository entity transmits, to the network policy entity, configuration data comprising an indication that the network policy entity is to report, to the network exposure entity, instances of the wireless device accessing the one or more sites over the mobile communication network. In some embodiments step 706 may correspond to step 305, described above with respect to FIG. 3.

Figure 8:
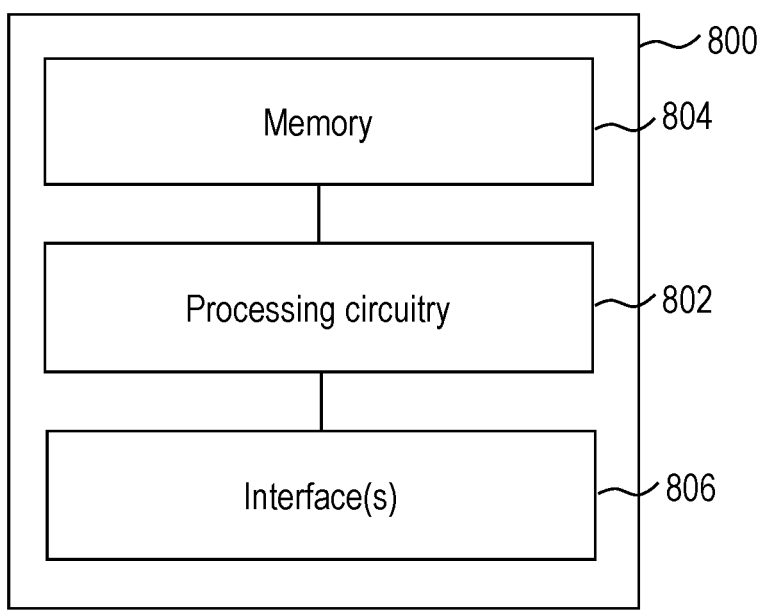
FIG. 8 is a schematic diagram of network entities according to embodiments of the disclosure.

FIG. 8 is a schematic diagram of network entities according to embodiments of the disclosure. When configured to implement a client network entity (e.g., an AF), apparatus 800 is operable to carry out the example method described with reference to FIG. 4 and possibly any other processes or methods disclosed herein. It is also to be understood that the method of FIG. 4 is not necessarily carried out solely by apparatus 800. At least some operations of the method can be performed by one or more other entities.

When configured to implement a network exposure entity (e.g., NEF, SCEF), apparatus 800 is operable to carry out the example method described with reference to FIG. 5 and possibly any other processes or methods disclosed herein. It is also to be understood that the method of FIG. 5 is not necessarily carried out solely by apparatus 800. At least some operations of the method can be performed by one or more other entities.

When configured to implement a network policy entity (e.g., a PCF, PCRF, etc), apparatus 800 is operable to carry out the example method described with reference to FIG. 6 and possibly any other processes or methods disclosed herein. It is also to be understood that the method of FIG. 6 is not necessarily carried out solely by apparatus 800. At least some operations of the method can be performed by one or more other entities.

When configured to implement a data repository entity (e.g., UDR, SPR, etc), apparatus 800 is operable to carry out the example method described with reference to FIG. 7 and possibly any other processes or methods disclosed herein. It is also to be understood that the method of FIG. 7 is not necessarily carried out solely by apparatus 800. At least some operations of the method can be performed by one or more other entities.

Apparatus 800 comprises processing circuitry 802, which may include one or more microprocessor or microcontrollers, as well as other digital hardware, which may include digital signal processors (DSPs), special-purpose digital logic, and the like. The processing circuitry 802 may be configured to execute program code stored in memory 804, which may include one or several types of memory such as read-only memory (ROM), random-access memory, cache memory, flash memory devices, optical storage devices, etc. Program code stored in memory 804 includes program instructions for executing one or more telecommunications and/or data communications protocols as well as instructions for carrying out one or more of the techniques described herein, in several embodiments. In some implementations, the processing circuitry 802 may cause the apparatus 800 to perform corresponding functions according to one or more embodiments of the present disclosure.

When configured to implement a client network entity (e.g., an AF), the processing circuitry 802 is configured to cause the apparatus 800 to: transmit, to a network exposure entity of the mobile communication network, a request message for the network exposure entity to report instances of one or more wireless devices accessing one or more sites over the mobile communication network; and receive, from the network exposure entity, a report of instances of one or more wireless devices accessing the one or more sites over the mobile communication network.

When configured to implement a network exposure entity (e.g., NEF, SCEF, etc), the processing circuitry 802 is configured to cause the apparatus 800 to: receive, from a client network entity, a request message for the network exposure entity to report instances of one or more wireless devices accessing one or more sites over the mobile communication network; and transmit, to the client network entity, a report of instances of one or more wireless devices accessing the one or more sites over the mobile communication network.

When configured to implement a network policy entity (e.g., PCF, PCRF), the processing circuitry 802 is configured to cause the apparatus 800 to: obtain an instruction for the network policy entity to report, to a network exposure entity, instances of one or more wireless devices accessing one or more sites over the mobile communication network; and transmit, to the network exposure entity, a report of instances of one or more wireless devices accessing the one or more sites over the mobile communication network.

When configured to implement a data repository entity (e.g., UDR, SPR), the processing circuitry 802 is configured to cause the apparatus 800 to: receive, from a network exposure entity, an indication that network policy entities of the mobile communication network are to report instances of one or more wireless devices accessing one or more sites over the mobile communication network; receive, from a network policy entity, a request for configuration data applicable to a session being established for a wireless device; and transmit, to the network policy entity, configuration data comprising an indication that the network policy entity is to report, to the network exposure entity, instances of the wireless device accessing the one or more sites over the mobile communication network.

The apparatus 800 may be implemented in a node of a communication network, such as a radio network, an optical network, or an electronic network. Thus the apparatus 800 further comprises one or more interfaces 806 with which to communicate with one or more other nodes of the communication network (e.g., the receiving node). The interface(s) 806 may therefore comprise hardware and/or software for transmitting and/or receiving one or more of: radio signals; optical signals; and electronic signals.

In alternative embodiments, the apparatus 800 may comprise one or more units or modules configured to perform the steps of the method, for example, as illustrated in any of FIGS. 4 to 7. The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a client network entity for monitoring access to one or more sites over a mobile communication network, the method comprising:

transmitting, to a network exposure entity of the mobile communication network, a request message for the network exposure entity to report instances of one or more wireless devices accessing one or more sites over the mobile communication network;

receiving, from the network exposure entity, a report of instances of one or more wireless devices accessing the one or more sites over the mobile communication network; and the request message comprising:

a policy configuration comprising an indication of one or more actions to be performed by the mobile communication network to mitigate access to the one or more sites by the one or more wireless devices; and a filter indicating one or more circumstances in which access to the one or more sites over the mobile communication network is to be monitored, the one or more circumstances comprising one or more of:

a time period in which access to the one or more sites over the mobile communication network is to be monitored;

a geographical location of wireless devices that are to be monitored for access to the one or more sites; and identities of one or more wireless devices that are to be monitored for access to the one or more sites.

2. The method according to claim 1, wherein the request message comprises information enabling traffic to the one or more sites to be identified.

3. The method according to claim 2, wherein the information enabling traffic to the one or more sites to be identified comprises one or more of:

a packet flow description for traffic to or from the one or more sites;

one or more source or destination network addresses corresponding to the one or more sites; and a category of traffic to or from the one or more sites.

4. The method according to claim 1, wherein the request message comprises a reporting configuration for the network exposure entity to report to the client network entity.

5. The method according to claim 4, wherein the reporting configuration comprises one or more of:

an indication of information to be included in the reports to the client network entity; and an indication of timing of reports to be transmitted by the network exposure entity to the client network entity.

6. The method according to claim 1, wherein the request message comprises a request to subscribe to receive one or more reports of an event, and wherein the event comprises access by one or more wireless devices to the one or more sites.

7. A method performed by a network exposure entity for monitoring access to one or more sites over a mobile communication network, the method comprising:

receiving, from a client network entity, a request message for the network exposure entity to report instances of one or more wireless devices accessing one or more sites over the mobile communication network;

transmitting, to the client network entity, a report of instances of one or more wireless devices accessing the one or more sites over the mobile communication network;

transmitting, to one or more network policy entities of the mobile communication network identified as serving the one or more wireless devices, an indication that the at least one network policy entity is to report, to the network exposure entity, instances of one or more wireless devices accessing the one or more sites over the mobile communication network;

receiving, from the one or more network policy entities of the mobile communication network, a report of instances of one or more wireless devices accessing the one or more sites over the mobile communication network; and the request message comprising an indication of identities for the one or more wireless devices, wherein the indication that the network policy entity is to report instances of one or more wireless devices accessing the one or more sites is transmitted to a plurality of network policy entities, a plurality of reports of instances of one or more wireless devices accessing the one or more sites over the mobile communication network being received from the plurality of network policy entities, and the report transmitted to the client network entity comprises an aggregate of information from the plurality of reports received from the network policy entities.

8. The method according to claim 7, further comprising:

determining whether the client network entity is authorised to request reports of instances of one or more wireless devices accessing the one or more sites; and responsive to a determination that the client network entity is not authorised to request reports of instances of one or more wireless devices accessing the one or more sites, transmitting a rejection message to the client network entity, comprising an indication that the request message is rejected.

9. The method according to claim 7, wherein the report comprises one or more of:

a list of instances of wireless devices accessing the one or more sites; and a list of identities of wireless devices that accessed the one or more sites; and statistical information relating to access of the one or more sites by wireless devices over the mobile communication network.

10. The method according to claim 7, further comprising transmitting, to a data repository entity of the mobile communication network, an indication that network policy entities are to report, to the network exposure entity, instances of one or more wireless devices accessing the one or more sites over the mobile communication network.

11. The method according to claim 7, wherein the network exposure entity comprises one of:

a network exposure function, NEF; and a service capabilities exposure function, SCEF.

12. A client network entity for monitoring access to one or more sites over a mobile communication network, the client network entity comprising processing circuitry and a non-transitory machine-readable medium storing instructions which, when executed by the processing circuitry, cause the client network entity to:

transmit, to a network exposure entity of the mobile communication network, a request message for the network exposure entity to report instances of one or more wireless devices accessing one or more sites over the mobile communication network;

receive, from the network exposure entity, a report of instances of one or more wireless devices accessing the one or more sites over the mobile communication network; and the request message comprising:

a policy configuration comprising an indication of one or more actions to be performed by the mobile communication network to mitigate access to the one or more sites by the one or more wireless devices; and a filter indicating one or more circumstances in which access to the one or more sites over the mobile communication network is to be monitored, the one or more circumstances comprising one or more of:

a time period in which access to the one or more sites over the mobile communication network is to be monitored;

a geographical location of wireless devices that are to be monitored for access to the one or more sites; and identities of one or more wireless devices that are to be monitored for access to the one or more sites.

13. The client network entity according to claim 12, wherein the request message comprises information enabling traffic to the one or more sites to be identified.

14. A network exposure entity for monitoring access to one or more sites over a mobile communication network, the network exposure entity comprising processing circuitry and a non-transitory machine-readable medium storing instructions which, when executed by the processing circuitry, cause the network exposure entity to:

receive, from a client network entity, a request message for the network exposure entity to report instances of one or more wireless devices accessing one or more sites over the mobile communication network;

transmit, to the client network entity, a report of instances of one or more wireless devices accessing the one or more sites over the mobile communication network;

transmit, to one or more network policy entities of the mobile communication network identified as serving the one or more wireless devices, an indication that the at least one network policy entity is to report, to the network exposure entity, instances of one or more wireless devices accessing the one or more sites over the mobile communication network;

receive, from the at least one network policy entity of the mobile communication network, a report of instances of one or more wireless devices accessing the one or more sites over the mobile communication network; and the request message comprising an indication of identities for the one or more wireless devices, the indication that the network policy entity is to report instances of one or more wireless devices accessing the one or more sites being transmitted to a plurality of network policy entities, a plurality of reports of instances of one or more wireless devices accessing the one or more sites over the mobile communication network being received from the plurality of network policy entities, and the report transmitted to the client network entity comprising an aggregate of information from the plurality of reports received from the network policy entities.

15. The network exposure entity according to claim 14, wherein the report comprises one or more of:

a list of instances of wireless devices accessing the one or more sites;

a list of identities of wireless devices that accessed the one or more sites; and statistical information relating to access of the one or more sites by wireless devices over the mobile communication network.

16. A non-transitory machine-readable medium storing instructions which, when executed by processing circuitry of an apparatus, cause the apparatus to perform a method for monitoring access to one or more sites over a mobile communication network, the method comprising:

transmitting a request message for the network exposure entity to report instances of one or more wireless devices accessing one or more sites over the mobile communication network;

receiving a report of instances of one or more wireless devices accessing the one or more sites over the mobile communication network; and the request message comprising:

a policy configuration comprising an indication of one or more actions to be performed by the mobile communication network to mitigate access to the one or more sites by the one or more wireless devices; and a filter indicating one or more circumstances in which access to the one or more sites over the mobile communication network is to be monitored, the one or more circumstances comprising one or more of:

a time period in which access to the one or more sites over the mobile communication network is to be monitored;

a geographical location of wireless devices that are to be monitored for access to the one or more sites; and identities of one or more wireless devices that are to be monitored for access to the one or more sites.

17. The method according to claim 1, wherein the policy configuration comprises one or more of: an indication that access to the one or more sites by the one or more wireless devices is to be blocked; an indication that access to the one or more sites is to be blocked for all wireless devices; an indication that a message is to be transmitted to the one or more wireless devices informing users of the one or more wireless devices that their access of the one or more sites has been recorded.

* * * * *